Figure 1:
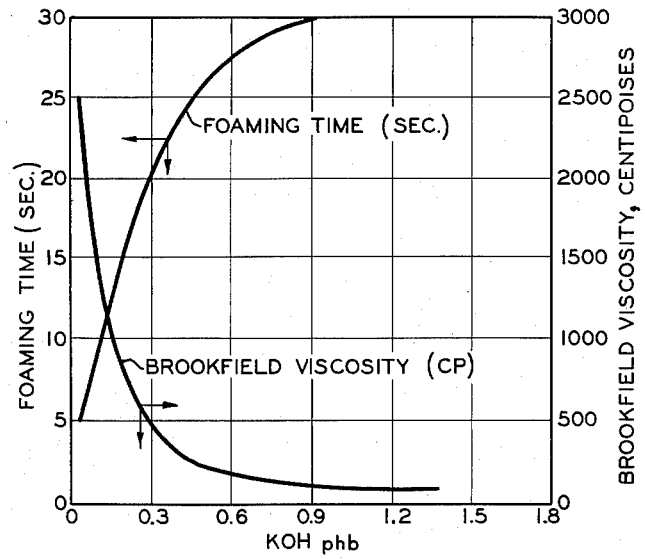

Dec. 20, 1960    J. H. CARROLL ET AL    2,965,510
CARBON BLACK SLURRIES AND METHOD OF PREPARATION
Filed June 6, 1958

EFFECT OF VARIATION OF CAUSTIC LEVEL IN PREPARATION
OF BLACK SLURRIES AT 5 phb ROSIN SOAP LEVEL EFFECT OF VARIATION OF ROSIN SOAP LEVEL IN PREPARATION
OF BLACK SLURRIES AT CONSTANT KOH/SOAP RATIO

INVENTORS.
J. H. CARROLL
J. A. RUNBERG
BY    H. E. BENJAMIN

*Hudson & Young*

ATTORNEYS

United States Patent Office 2,965,510
Patented Dec. 20, 1960

2,965,510

CARBON BLACK SLURRIES AND METHOD OF PREPARATION

James H. Carroll, John A. Runberg, and Harwell E. Benjamin, Borger, Tex., assignors to Phillips Petroleum Company, a corporation of Delaware Filed June 6, 1958, Ser. No. 740,264

7 Claims. (Cl. 106—238)

This invention relates to carbon black slurries and their method of preparation. In one aspect the invention relates to a method for preparing carbon black slurries containing a rosin acid soap as dispersant and also containing caustic, together with an antifoam agent, whereby foaming of the slurry is greatly reduced or eliminated. In another aspect the invention relates to a carbon black slurry comprising water, carbon black, a rosin acid soap, caustic and an antifoam agent.

Carbon black is widely used as a reinforcing agent in rubber. It has been conventional practice to incorporate carbon black into rubber by vigorous milling on a roll mill, Banbury mixer, or the like. This method has not only proved tedious but it is frequently difficult to obtain good dispersions of the black, particularly in synthetic rubber on account of its resistance to breakdown upon milling. Since synthetic rubber is generally produced in the form of a latex, it has been proposed to incorporate carbon black into the latex, thereby making it possible to obtain a more uniform dispersion and also to improve the milling characteristics of the polymer.

Carbon black is generally added to latex in the form of an aqueous slurry which is ordinarily prepared with the aid of a dispersing agent. Sodium lignin sulfonate is the usual dispersing agent for such purposes and the amount frequently considered sufficient for a satisfactory slurry is around 2 to 4 parts by weight per 100 parts of carbon black. While good aqueous dispersions of carbon black can be produced by this procedure, it has been observed that the finished rubber in which such dispersions have been employed is frequently inferior in some properties, e.g., abrasion resistance, to rubber in which dry carbon black has been added on the mill. It is believed that sodium lignin sulfonate in some way prevents the carbon black from exerting its maximum reinforcing effect on the rubber, possibly by being adsorbed irreversibly on the black.

If, however, a rosin acid soap is used as dispersing agent for the carbon black, no deterioration in properties is observed. Therefore, because of the relatively superior properties imparted by preparing a carbon black slurry with a rosin acid soap, when the slurry is compounded in rubber, rather then with other dispersing agents, rosin acid soaps are often preferred when preparing a carbon black slurry for masterbatching with rubber. However, a difficulty which has retarded the use of such carbon black slurries is the very troublesome foaming of such slurries during preparation and subsequent handling. Further, the high viscosities of such slurries makes them difficult to handle in ordinary plant procedures. It is an object of this invention to overcome these problems.

We have now found a method for preparing carbon black slurries with little or no foaming using a rosin acid soap as dispersing agent which comprises mixing the carbon black and water containing a rosin acid soap and a base by employing a particular antifoam agent in combination with the use of at least 5 parts by weight of said rosin acid soap and at least 0.2 part by weight of a base selected from the group consisting of an alkali metal and ammonium hydroxides, per 100 parts of the carbon black (preferably at least 0.3 part by weight). The amount of water employed in the recipe is usually sufficient to give a carbon black slurry having a solids content in the range between 8 and 20 weight percent. The mixture is subjected to mild agitation until all of the black has been wetted and the solids content of the slurry has leveled off to a constant value. Such carbon black slurries also have a very reduced tendency to foam in subsequent handling. Another difficulty solved by the method is that the extremely high viscosity of the slurries prepared in the past using a rosin acid soap is also overcome by the process and composition of the invention.

The antifoam agent employed in the method and slurry composition of the invention has the composition on a dry basis, of 55 to 72 weight percent of a higher aliphatic alcohol having a carbon chain of 14 to 25 carbon atoms which is solid at room temperature and has a melting point below 100° C., from 3 to 25 weight percent of a higher aliphatic acid having a carbon chain of 14 to 25 carbon atoms which is solid at room temperature and has a melting point below 100° C., and from 5 to 42 percent, based on the weight of the composition of an alkali metal or amine soap of a higher aliphatic fatty acid having 14 to 25 carbon atoms. In such composition the alcohol is advantageously an alcohol, or mixture of alcohols, predominantly with a carbon chain of 16 to 18 carbon atoms, such as stearyl, cetyl, palmitoleyl and oleyl alcohols; the fatty acid is advantageously an acid, or mixture of fatty acids, predominantly with a carbon chain of 16 to 18 carbon atoms, such as stearic, palmitic, and oleic acids.

A particularly useful range of ingredients of the foregoing antifoam composition is 57 to 64 weight percent of the defined alcohol, 10 to 20 weight percent of the defined acid and 20 to 30 weight percent of the defined soap of the higher aliphatic acid.

The alkali metal, such as sodium and potassium, or amine soaps can be, and usually are, the soaps corresponding to the acid employed in the composition. Particularly useful are the amine soaps. The amines usually employed contain only carbon, hydrogen, and nitrogen with or without alcoholic oxygen and from 2 to 8 carbon atoms. Examples of such soaps are potassium stearate, sodium oleate, triethanolamine stearate, ethyl ethanolamine myristate, triethylamine palmitate, aminoethanolamine, oleate, methyl diethanolamine stearate, 2-amino-2-methyl-1-propanol salt of palmitic acid, and diethanolamine stearate.

The antifoam agent is usually added to the water as a dilute aqueous solution. Concentrations of 1 to 2 percent in water are often employed. The amount of the antifoam agent employed in the method and composition of the invention is usually 0.005 to 0.2 part by weight per 100 parts of the carbon black, although higher or lower amounts can be used.

Usually, the amount of rosin acid soap employed in preparing the slurry will not exceed 15 parts by weight and the amount of caustic employed will not be more than 1.5 parts by weight per 100 parts of black.

The carbon black slurries are prepared by dissolving the caustic and rosin acid soap in the water and adding the carbon black after the addition of the antifoam agent. In some instances a portion of the water is used originally, say 25 percent or more, and the remainder added after the addition of the black has been started. Addition of the black can be accomplished in several different ways. It can be added rapidly in one portion, it can be continuously discharged from a micropulverizer, or it can be added in two or more increments. The mixture is subjected to mild agitation during addition of the black and for a sufficient period afterward to insure complete wetting of the black and get a slurry having a constant solids content. Carbon black slurries having a solids content in the range between 8 and 20, more usually between 10 and 16, weight percent are prepared by this process, although concentrations outside this range are applicable.

The rosin soaps employed in the production of the carbon black slurries are generally prepared from rosin acids by treatment with an alkili metal hydroxide, preferably sodium hydroxide or potassium hydroxide, although other alkali metal hydroxides, i.e., lithium, rubidium, and cesium hydroxides, can be employed as well as ammonium hydroxide. The rosin acids can be obtained from any source, for example, from wood, gums, etc., and can be used as such or treated in various ways to effect purification. Broadly, they are the natural rosin acids and disproportionation reaction products thereof having the same number of carbon atoms per molecule and the same arrangement of carbon atoms as the natural rosin acids. The disproportionated rosin acids, that is, rosin acids treated in such a way that selective dehydrogenation and hydrogenation occur, are particularly effective. Specific examples of rosin acid components which are applicable are abietic acid and dehydro-, dihydro-, and tetrahydroabietic acids. Materials found to be particularly effective are the potassium salt of tetrahydroabietic acid and mixtures of potassium salts of dehydro-, dihydro-, and tetrahydroabietic acids.

While any type of carbon black can be employed for preparing the slurries in accordance with this process, furnace black slurries are often preferred for masterbatching with a synthetic rubber latex.

In preparing the carbon black slurries the temperature of the water employed for the preparation is usually in the range between 60 and 160° F. Room temperature is ordinarily employed.

Four series of foaming tests of rosin acid soap-carbon black slurries were effected to show the effect of the three variables, (1) amount of rosin acid soap, (2) amount of caustic, and (3) type and amount of antifoam agent. These tests are shown in Examples I through IV. In each series of tests the recipe employed was 100 parts by weight of carbon black for about 580 to 600 parts by weight of water. The exact amounts of water are shown in the tables in each example. The carbon black in each case was micropulverized Philblack O, a high abrasion furnace carbon black. In each series of runs the soap solution was first prepared by adding the potassium hydroxide and the rosin acid soap (potassium soap of disproportionated rosin acid) to the water and then adding the carbon black in three equal increments and stirring after the addition of each increment of carbon black until the black appeared to be wetted. The slurries were prepared at about room temperature. In those cases where an antifoam agent was employed, it was also added to and mixed uniformly with the slurry. Severe foaming tests of the prepared slurries were effected by introducing the slurries into a cylindrical glass tube containing about 6 inches of the slurry and then introducing air for mixing and agitation into the bottom of the glass tube at a constant pressure of 2 centimeters of mercury through a ⅛ inch orifice. The foaming time recorded in each of the tables was the time for foam to rise 30 inches in the tube while bubbling the air through the slurry as described.

Examples I and II show, respectively, the effect of variation in the caustic level at a constant rosin acid soap level, and, the effect of variation in rosin acid soap level at a constant caustic to rosin acid soap ratio.

*Example I*

In these runs, the rosin acid soap level was held at a constant value, while the amount of potassium hydroxide was varied as shown in the table below. Rosin soap was used in ratio of 5 parts/100 parts black by weight.

SLURRY DATA

| Run No. | 1 | 2 | 3 | 4 | 5 | 6 |
|---|---|---|---|---|---|---|
| Water | 580 | 580 | 580 | 580 | 580 | 580 |
| Carbon black | 100 | 100 | 100 | 100 | 100 | 100 |
| Potassium hydroxide | 0.0465 | 0.465 | 0.6975 | 0.930 | 1.1625 | 1.395 |
| pH | 8.9 | 11.0 | 11.6 | 11.7 | 12.0 | 12.3 |
| Brookfield Viscosity, cp | 2,500 | 275 | 175 | 75 | 105 | 100 |
| Soap Solution Volume, ml | 850 | 850 | 850 | 850 | 850 | 850 |
| Slurry Volume, ml | | 1,060 | 1,400 | 1,300 | 1,300 | 1,200 |
| Foaming time, seconds | 5 | 25 | 28 | 30 | | |

The Brookfield viscosity was determined on each of the finished slurries. In Figure 1 the results of this table are plotted, and illustrate the value of using a caustic level of 0.2 or above, preferably 0.3 or above. It is preferred that the slurries, for best handling have a Brookfield viscosity of less than 800 centipoises, preferably less than 500 centipoises.

*Example II*

In this example, while holding the caustic level constant in relation to the amount of the rosin acid soap, the amount of rosin acid soap was varied as shown in the table below. About 0.19 part by weight of potassium hydroxide were employed for each part by weight of rosin acid soap.

SLURRY DATA

| Run No. | 1 | 2 | 3 |
|---|---|---|---|
| Water | 580 | 600 | 600 |
| Carbon black | 100 | 100 | 100 |
| Rosin acid soap, parts | 5.0 | 6.0 | 7.0 |
| pH | 11.7 | 12.2 | 12.2 |
| Brookfield Viscosity, cp | 75 | | 36 |
| Soap Solution Volume, ml | 850 | 830 | 860 |
| Slurry volume, ml | 1,300 | 1,540 | 1,500 |
| Foaming Time, seconds | 30 | 43 | 45 |

Figure 2:
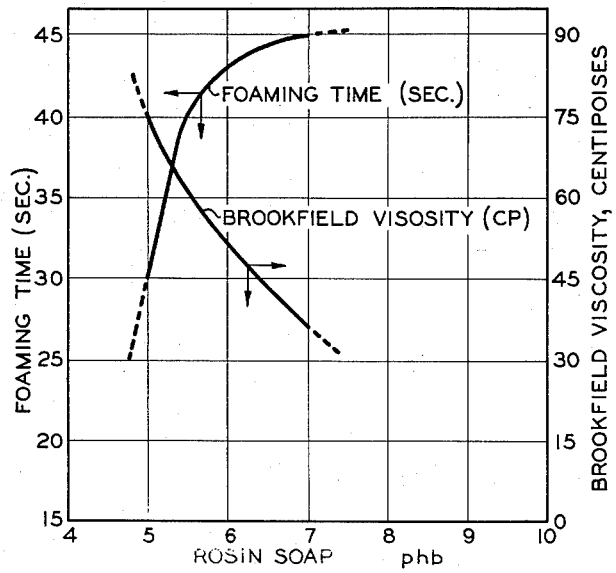

From this table and Figure 2, which shows the data in graphical form, it will be seen that increasing the amount of rosin acid soap decreases the tendency to foam and also decreases the viscosity of the slurry.

*Example III*

Carbon black slurries were prepared using the same recipe as in Run 1 of Example II. In each case, however, except Run 1 of the following table, 0.05 part per 100 parts by weight of carbon black of an antifoam agent was added to each of the slurries before the foaming test was conducted in the manner described in the other examples. The results are shown in the table below.

SLURRY DATA

| Run No. | pH | Brookfield Viscosity | Antifoam | Foaming Time (Seconds) |
|---|---|---|---|---|
| 1 | 12.0 | 85 | None | 30 |
| 2 | 11.9 | 68 | TCP [a] | 40 |
| 3 | 11.9 | 77 | (See note [b]) | ([j]) |
| 4 | 11.9 | 54 | Defoamer 33/2 [c] | 35 |
| 5 | 11.9 | 65 | Tolbe F [d] | 35 |
| 6 | 11.9 | 54 | Hallco C-442 [e] | 43 |
| 7 | 11.9 | 50 | DC-AF [f] | 37 |
| 8 | 11.9 | 170 | DC-A [g] | 37 |
| 9 | 11.9 | 100 | DC-B [h] | 37 |

[a] Tricresyl phosphate.
[b] A solid intimate admixture of about 60% technical grade stearyl alcohol (about 85–90% cetyl alcohol with lesser amounts of stearyl alcohol, palmitoleyl alcohol, oleyl alcohol and myristyl alcohol); about 16% tallow fatty acid (about 61% stearic acid, 27% palmitic acid and lesser amounts of other fatty acids including oleic and myristic acid), and about 24% of triethanolamine soap of the foregoing tallow fatty acid.
[c] A proprietary antifoam agent of Hercules Powder Company.
[d] A proprietary antifoam agent.
[e] A proprietary antifoam agent.
[f] A silicone antifoam agent.
[g] A silicone antifoam agent.
[h] A silicone antifoam agent.
[j] Foam increased only 4 inches after 300 seconds.

Example IV

In this example a slurry was prepared in the same manner and using the same slurry recipe and same antifoam agent as in Run 3 of Example III except for the amounts of the antifoam agent shown in the table. The parts of antifoam agent are parts by weight per 100 parts by weight of the carbon black employed.

SLURRY DATA

| Run No. | pH | Brookfield Viscosity | Parts Antifoam Agent | Foaming Time (Seconds) |
|---|---|---|---|---|
| 1 | 12.0 | 85 | | 30 |
| 2 | | 89 | 0.01 | 50 |
| 3 | | 55 | 0.03 | 70 |
| 4 | | 45 | 0.04 | 155 |
| 5 | | 45 | 0.05 | 220 |
| 6 | | 45 | 0.10 | (a) | a Slurry rose only 14 inches after 10 minutes (600 seconds) in the foam tester.

The foregoing data show the very great improvement in the tendency to foam brought about by the use of very small amounts of the antifoam agent employed according to the invention.

Example V

Two carbon black slurries were prepared according to the following recipes; the amounts given are parts by weight:

| | | |
|---|---|---|
| Water | 571 | 671 |
| Philblack O (loose black) | 100 | 100 |
| Disproportionated rosin acid, potassium salt | 6.9 | 7.0 |
| KOH | 0.99 | 1.0 |
| Antifoam agent of footnote b of Example III | 0.1 | 0.06 |
| Brookfield Viscosity, cps | 410 | 660 |

The slurries were prepared in a 1000 gallon slurry make-up tank, equipped with two 26-inch diameter 5-blade turbine impellers. The KOH, rosin acid soap and antifoam agent were dissolved in the water in the tank and then the black was added in increments, with stirring. The black in each run was wetted without difficulty and no trouble with foaming was encountered. The viscosity of the finished slurries indicates the effect of the increased amount of antifoam agent; thus, in the run with the highest black concentration and the highest concentration of antifoam agent, the viscosity was lowest.

Example VI

Two carbon black slurries were prepared in accordance with the following recipes:

| | Parts by Weight | |
|---|---|---|
| | 1 | 2 |
| Water | 821 | 776 |
| Philblack E [1] (micropulverized pelleted) | 100 | 100 |
| Disproportionated rosin acid, potassium salt | 7.08 | |
| Sodium lignin sulfonate | | 2.16 |
| KOH | 1.01 | 0.3 |
| Antifoam Agent [2] | 0.1 | |

[1] Super abrasion furnace black.
[2] A solid intimate admixture of about 60% technical grade stearyl alcohol (about 85–90% cetyl alcohol with lesser amounts of stearyl alcohol, palmitoleyl alcohol, oleyl alcohol and myristyl alcohol); about 16% tallow fatty acid (about 61% stearic acid, 27% palmitic acid and lesser amounts of other fatty acids including oleic and myristic acid), and about 24% of triethanolamine soap of the foregoing tallow fatty acid.

The slurry for recipe 1 was prepared in a 1000 gallon make-up tank equipped with turbine agitators by dissolving the rosin soap and caustic in a portion of the make-up water heated to 140–150° F. followed by addition of the remaining cold make-up water and the black in 21 increments. After each increment of black was introduced, mild agitation was continued until the black was wet as evidenced by its disappearance from the surface of the slurry. After all the black had been added, mild agitation was continued until the solids content of the slurry had leveled off to a constant value. An appreciable amount of surface foam developed after the first 13 increments had been added. The amount of foam was not serious, but was undesirable. This run shows the advisability of adding an antifoam agent prior to introduction of the black. The finished slurry had a solids content of 10.4 weight percent, a pH of 11.4, and a Brookfield viscosity of 260 centipoises. The foam was broken by the addition of 0.1 part per 100 parts of total black of the antifoam agent of footnote (b) of Example III and bringing the foam in contact with the upper mixer impeller.

The slurry for recipe 2 was prepared in a manner similar to that for recipe 1 except that no antifoam agent was employed. The final slurry had a pH of 10.3, a solids content of 11.6 weight percent, and a Brookfield viscosity of 155 centipoises.

Masterbatches were prepared from each of the carbon black slurries with a butadiene/styrene latex prepared by emulsion polymerization at 41° F. using an iron-activated, rosin-soap emulsified recipe. The rubbery copolymer had a raw Mooney value (ML–4) of 52 and a bound styrene content of 23.5 weight percent.

The latex and black slurry from recipe 1 were mixed at 135° F. for 25 minutes prior to coagulation. A dilute acid-glue mixture was used for coagulation. The dried crumb had good black dispersion and very little crocking was observed.

The latex and black slurry from recipe 2 were mixed at 125° F. for 25 minutes prior to coagulation with a dilute acid-glue mixture. Very little loose black was observed and milled samples contained no hard particles.

The masterbatches were compounded in the following tread recipe:

| | Parts by weight |
|---|---|
| Masterbatch (100 polymer, 40 black) | 140 |
| Zinc oxide | 3 |
| Stearic acid | 1 |
| Flexamine [1] | 1 |
| Philrich 5 [2] | 4 |
| Sulfur | 1.75 |
| Sandtocure [3] | 1.25 |

[1] Physical mixture containing 65 percent of a complex diarylamine-ketone reaction product and 35 percent of N,N'-diphenyl-p-phenylenediamine.
[2] Highly aromatic oil used as a rubber softener.
[3] N-cyclohexyl-2-benzothiazylsulfenamide.

The stocks were mixed in a Banbury mixer and given two remills on a 6" x 12" roll mill. They were cured for 30 minutes at 307° F. and physical properties determined. Results were as follows:

| | 1 | 2 |
|---|---|---|
| $\gamma \times 10^4$ moles/cc [1] | 1.42 | 1.47 |
| Unaged Samples: | | |
| Compression set, percent | 18.0 | 19.6 |
| 300 percent Modulus, p.s.i., 80° F | 1,025 | 990 |
| Tensile, p.s.i., 80° F | 4,200 | 4,000 |
| Elongation, percent, 80° F | 625 | 650 |
| ΔT, F | 61.2 | 65.2 |
| Resilience, percent | 59.8 | 59.4 |
| Flex life, M [2] | 10.0 | 10.6 |
| Shore hardness | 60 | 61 |
| Abrasion loss, cc | 9.17 | 10.23 |
| MS 1½ at 212° F | 33 | 36.5 |
| Oven Aged 24 hours at 212° F.: | | |
| 300 percent Modulus, p.s.i., 80° F | 2,140 | 2,010 |
| Tensile, p.s.i., 80° F | 3,780 | 3,360 |
| Elongation, percent, 80° F | 430 | 470 |
| ΔT, F | 54.1 | 54.4 |
| Resilience, percent | 64.2 | 64.7 |
| Flex life, M [2] | 4.2 | 4.8 |
| Shore Hardness | 68.5 | 69 |
| Abrasion loss, cc | 7.48 | 8.45 |

[1] The density of network chains is related to the number of crosslinks by the function $$\gamma = 2n - \frac{2\delta}{M}$$

where $n$ is the number of crosslinks, $\delta$ is the density of the polymer, and $M$ is the molecular weight.
[2] Thousands of flexures to failure.

These data show the improvement in abrasion resistance that is realized when the carbon black slurry preparation of the present invention is employed.

Example VII

A carbon black slurry was prepared in a 1000 gallon make-up tank in accordance with the following recipe:

| | Parts by weight |
|---|---|
| Water | 793 |
| Philblack I [1] (micropulverized pelleted) | 100 |
| Rosin soap [2] | 6.88 |
| KOH | 0.983 |
| Antifoam agent [2] | 0.098 |

[1] Intermediate super abrasion furnace black.
[2] As in Example V.

A foam free dispersing agent solution was prepared by dissolving the rosin soap and KOH in a portion of the heated make-up water as in Example VI. The antifoam agent was then added, the water level was brought up to about half of the final level and one-third of the black was introduced and wetted before adding the remainder of the water and black. The remainder of the black was added in two increments. Mild agitation was continued until all the black had disappeared from the surface of the slurry and the solids content had leveled off to a constant value. The final slurry contained some fine internal bubbles but no surface foam. It had a solids content of 12.0 weight percent, a pH of 11.6, and a Brookfield viscosity of 310 centipoises.

As will be evident to those skilled in the art, various modifications of this invention can be made or followed in the light of the foregoing disclosure and discussion without departing from the spirit or scope of the disclosure or from the scope of the claims.

We claim:

1. A method for preparing a carbon black slurry which comprises mixing with agitation carbon black and water containing, per 100 parts by weight of carbon black, about 5 to 15 parts of a rosin acid soap, about 0.2 to 1.5 parts of a base selected from the group consisting of the alkali metal and ammonium hydroxides, and a small amount sufficient to decrease the foaming tendency of said slurry of an antifoam agent of the following composition: 55 to 72 weight percent of a higher aliphatic alcohol having a carbon chain of 14 to 25 carbon atoms which is solid at room temperature and has a melting point below 100° C., from 3 to 25 weight percent of a higher aliphatic acid having a carbon chain of 14 to 25 carbon atoms which is solid at room temperature and has a melting point below 100° C., and from 5 to 42 percent, based on the weight of the composition of a soap selected from the group consisting of an alkali metal soap and an amine soap of a higher aliphatc fatty acid having 14 to 25 carbon atoms.

2. A method for preparing a carbon black slurry which comprises mixing with agitation carbon black and water containing, per 100 parts by weight of carbon black, about 5 to 15 parts of a rosin acid soap, about 0.3 to 1.5 parts of a base selected from the group consisting of the alkali metal and ammonium hydroxides, and a small amount sufficient to decrease the foaming tendency of said slurry of an antifoam agent of the following composition: 55 to 72 weight percent of a mixture of higher aliphatic alcohols predominantly with a carbon chain of 16 to 18 carbon atoms which is solid at room temperature and has a melting point below 100° C., from 3 to 25 weight percent of a mixture of higher aliphatic acids predominantly with a carbon chain of 16 to 18 carbon atoms which is solid at room temperature and has a melting point below 100° C., and from 5 to 42 weight percent of an amine soap of a mixture of acids of the foregoing description.

3. A method for preparing a carbon black slurry which comprises mixing with agitation carbon black and water containing, per 100 parts by weight of carbon black, about 5 to 15 parts of a rosin acid soap, about 0.3 to 1.5 parts of a base selected from the group consisting of the alkali metal and ammonium hydroxides, and about 0.005 to 0.2 part of an antifoam agent of the following composition: 57 to 64 weight percent of a mixture of higher aliphatic alcohols predominantly with a carbon chain of 16 to 18 carbon atoms which is solid at room temperature and has a melting point below 100° C., from 10 to 20 weight percent of a mixture of higher aliphatic acids predominantly with a carbon chain of 16 to 18 carbon atoms which is solid at room temperature and has a melting point below 100° C., and from 20 to 30 weight percent of an amine soap of a mixture of acids of the foregoing description.

4. A method for preparing a carbon black slurry which comprises mixing with agitation carbon black and water containing, per 100 parts by weight of carbon black, about 5 to 15 parts of a rosin acid soap, about 0.3 to 1.5 parts of a base selected from the group consisting of the alkali metal and ammonium hydroxides, and about 0.005 to 0.2 part of an antifoam agent of the following composition: 57 to 64 weight percent of a mixture of higher aliphatic alcohols predominantly with a carbon chain of 16 to 18 carbon atoms which is solid at room temperature and has a melting point below 100° C., from 10 to 20 weight percent of a mixture of higher aliphatic acids predominantly with a carbon chain of 16 to 18 carbon atoms which is solid at room temperature and has a melting point below 100° C., and from 20 to 30 weight percent of the triethanolamine soap of a mixture of acids of the foregoing description.

5. A carbon black-rosin acid soap slurry of low foaming tendencies consisting essentially of carbon black and water containing, per 100 parts by weight of carbon black, about 5 to 15 parts of a rosin acid soap, about 0.3 to 1.5 parts of a base selected from the group consisting of the alkali metal and ammonium hydroxides, and a small amount sufficient to decrease the foaming tendency of said slurry of an antifoam agent of the following composition: 55 to 72 weight percent of a mixture of higher aliphatic alcohols predominantly with a carbon chain of 16 to 18 carbon atoms which is solid at room temperature and has a melting point below 100° C., from 3 to 25 weight percent of a mixture of higher aliphatic acids predominantly with a carbon chain of 16 to 18 carbon atoms which is solid at room temperature and has a melting point below 100° C., and from 5 to 42 weight percent of an amine soap of a mixture of acids of the foregoing description.

6. A carbon black-rosin acid soap slurry of low foaming tendencies consisting essentially of carbon black and water containing, per 100 parts by weight of carbon black, about 5 to 15 parts of a rosin acid soap, about 0.3 to 1.5 parts of a base selected from the group consisting of the alkali metal and ammonium hydroxides, and a small amount sufficient to decrease the foaming tendency of said slurry of an antifoam agent of the following composition: 57 to 64 weight percent of a mixture of higher aliphatic alcohols predominantly with a carbon chain of 16 to 18 carbon atoms which is solid at room temperature and has a melting point below 100° C., from 10 to 20 weight percent of a mixture of higher aliphatic acids predominantly with a carbon chain of 16 to 18 carbon atoms which is solid at room temperature and has a melting point below 100° C., and from 20 to 30 weight percent of an amine soap of a mixture of acids of the foregoing description.

7. A carbon black-rosin acid soap slurry of low foaming tendencies consisting essentially of carbon black and water containing, per 100 parts by weight of carbon black, about 5 to 15 parts of a rosin acid soap, about 0.3 to 1.5 parts of a base selected from the group consisting of the alkali metal and ammonium hydroxides, and about 0.005 to 0.2 part of an antifoam agent of the following composition: 57 to 64 weight percent of a mixture of higher aliphatic alcohols predominantly with a carbon chain of 16 to 18 carbon atoms which is solid at room temperature and has a melting point below 100° C., from 10 to 20 weight percent of a mixture of higher aliphatic acids predominantly with a carbon chain of 16 to 18 carbon atoms which is solid at room temperature and has a melting point below 100° C., and from 20 to 30 weight percent of the triethanolamine soap of a mixture of acids of the foregoing description.

References Cited in the file of this patent

UNITED STATES PATENTS

| | | |
|---|---|---|
| 2,046,757 | Tucker | July 7, 1936 |
| 2,310,972 | Livermore | Feb. 16, 1943 |
| 2,769,795 | Braendle | Nov. 6, 1956 |